(12) United States Patent
van den Heuvel et al.

(10) Patent No.: US 9,296,489 B2
(45) Date of Patent: Mar. 29, 2016

(54) FLIGHT RECORDER DEPLOYMENT MECHANISM

(71) Applicant: DRS C3 & Aviation Company, Herndon, VA (US)

(72) Inventors: Blake van den Heuvel, Ottawa (CA); Ari Kaufmann, West Orange, NJ (US); Mark Woozley, Herndon, VA (US); Peter Sterrantino, Herndon, VA (US)

(73) Assignee: DRS C3 & Aviation Company, Herndon, VA (US)

( * ) Notice: Subject to any disclaimer, the term of this patent is extended or adjusted under 35 U.S.C. 154(b) by 0 days.

(21) Appl. No.: 14/208,179

(22) Filed: Mar. 13, 2014

(65) Prior Publication Data

US 2014/0263839 A1    Sep. 18, 2014

Related U.S. Application Data

(60) Provisional application No. 61/785,511, filed on Mar. 14, 2013.

(51) Int. Cl.
B64D 45/00    (2006.01)

(52) U.S. Cl.
CPC ........ B64D 45/00 (2013.01); *B64D 2045/0065* (2013.01)

(58) Field of Classification Search
CPC ..... B64D 2045/0065; B64D 1/00; G01S 1/04
USPC .......... 244/1 R; 701/14, 35, 33.4; 312/223.2, 312/223.3; 361/679.01; 455/96, 98
See application file for complete search history.

(56) References Cited

U.S. PATENT DOCUMENTS

| | | | | |
|---|---|---|---|---|
| 2,959,671 A | * | 11/1960 | Stevinson | ........................ 455/96 |
| 2,974,898 A | * | 3/1961 | Stevinson et al. | ............. 244/1 R |
| 3,140,847 A | | 7/1964 | Ames, Jr. | |
| 3,157,890 A | * | 11/1964 | Mellon, Jr. et al. | ................ 441/9 |
| 3,181,809 A | * | 5/1965 | Lobelle | ......................... 244/1 R |

(Continued)

FOREIGN PATENT DOCUMENTS

| | | |
|---|---|---|
| CA | 530127 | 9/1956 |
| CA | 575533 | 5/1959 |

(Continued)

OTHER PUBLICATIONS

Automatic Deployable Flight Recorder (ADFR). Datasheet. DRS Technologies, Inc., DRS Integrated Defense Systems and Services (IDSS) Group. Nov. 15, 2012. 2 pages.

(Continued)

*Primary Examiner* — Benjamin P Lee
(74) *Attorney, Agent, or Firm* — Kilpatrick Townsend & Stockton LLP

(57) ABSTRACT

Embodiments of the invention are directed to a release device that uses an electro-mechanical mechanism instead of an explosive to deploy a deployable unit such as a flight data recorder. In one embodiment of the invention, a solenoid is activated that causes a piston surrounded by the solenoid to move which moves a pin attached to the piston and allows a spring to decompress and deploy a deployable unit. In some embodiments, a release actuator mechanism, a pneumatic actuator mechanism, a shape memory alloy or a combination thereof may be used to affect deployment of the deployable unit.

13 Claims, 9 Drawing Sheets

(56) References Cited

U.S. PATENT DOCUMENTS

| | | | |
|---|---|---|---|
| 3,200,402 A * | 8/1965 | Celeman al. | 346/38 |
| 3,360,728 A * | 12/1967 | Stevinson et al. | 206/305 |
| 3,390,846 A * | 7/1968 | Stevinson et al. | 244/1 R |
| 3,583,657 A * | 6/1971 | Boyce | 244/1 R |
| 4,795,112 A * | 1/1989 | Hashimoto | 244/33 |
| 5,359,917 A * | 11/1994 | Travor | 89/1.51 |
| 5,928,300 A | 7/1999 | Rogers et al. | |
| 6,510,776 B2 * | 1/2003 | Sirmalis et al. | 89/1.11 |
| 8,493,715 B1 | 7/2013 | Angelucci | |
| D701,207 S * | 3/2014 | van den Heuvel et al. | D14/432 |
| 8,880,283 B2 * | 11/2014 | Kaufmann et al. | 701/33.4 |
| 2004/0035687 A1 * | 2/2004 | von Behrens et al. | 200/6 C |
| 2010/0063654 A1 | 3/2010 | Winterhalter et al. | |
| 2010/0111600 A1 * | 5/2010 | De Bien | 403/375 |
| 2011/0060498 A1 | 3/2011 | Cannon et al. | |
| 2011/0126912 A1 * | 6/2011 | Grimseth et al. | 137/1 |
| 2012/0113575 A1 | 5/2012 | Uy et al. | |
| 2012/0138741 A1 | 6/2012 | Fabre et al. | |
| 2012/0166037 A1 | 6/2012 | Vinue Santolalla et al. | |
| 2014/0277923 A1 | 9/2014 | Kaufmann et al. | |
| 2014/0277924 A1 | 9/2014 | van den Heuvel et al. | |

FOREIGN PATENT DOCUMENTS

| | | |
|---|---|---|
| CA | 610741 | 12/1960 |
| CA | 886721 | 11/1971 |
| CA | 898617 | 4/1972 |
| CA | 1256916 | 7/1989 |
| FR | 2960517 A1 * | 12/2011 |
| FR | 2983833 A1 * | 6/2013 |
| FR | 3005634 A1 * | 11/2014 |
| GB | 2228458 A | 8/1990 |

OTHER PUBLICATIONS

Cornillou, Jean-Charles (2011). International Cospas-Sarsat Programme: From operations to MEOSAR prospects [PowerPoint slides], [retrieved on Jun. 26, 2013]. Retrieved from the Ifremer website: <URL: http://www.ifremer.fr/web-com/sar2011/Presentations/ SARWS2011_CORNILLOU.pdf>, 23 pages [earliest known date of availability on May 12, 2011].

CPI-406 Deployable Emergency Locator Transmitter (ELT). Datasheet [online]. DRS C3 & Aviation Company, [retrieved on Nov. 20, 2013]. Retrieved from the Internet: <URL: http://www.drs.com/Products/c3a/CPI406.aspx>, 2 pages. [earliest known date of availability on Jul. 18, 2010].

Deployable Flight Data Recorder System. Datasheet [online]. Fairchild Controls, Inc. [retrieved on Apr. 15, 2013]. Retrieved from the Internet: <http://www.fairchild-controls.com/wp-content/uploads/2011/10/FC-VFDRS-brochure.pdf>, 2 pages.

Deployable Flight Incident Recorder Set (DFIRS) 2100. Datasheet [online]. DRS C3 & Aviation Company, [retrieved on Nov. 20, 2013]. Retrieved from the Internet: <URL: http://www.drs.com/Products/c3a/DFIRS2100.aspx>, 2 pages. [earliest known date of availability on Sep. 4, 2010].

ELB3000F and EAS3000F Emergency Locator/Recorder System. Datasheet. DRS Data & Imaging Systems, Inc., [retrieved on Nov. 27, 2013]. Retrieved from the Internet: <URL: http://www.drs.com/Products/c3a/3000f.aspx >, 4 pages. [earliest known date of availability on Sep. 4, 2010].

Emergency Avionics System 3000 (EAS3000). Datasheet [online]. DRS C3 & Aviation Company, [retrieved on Nov. 20, 2013]. Retrieved from the Internet: <URL: http://www.drs.com/Products/c3a/EAS3000.aspx>, 2 pages. [earliest known date of availability on Jul. 21, 2010].

* cited by examiner

FLIGHT RECORDER DEPLOYMENT MECHANISM

CROSS-REFERENCES TO RELATED APPLICATIONS

This application is a non-provisional application of and claims the benefit of priority of U.S. Provisional application No. 61/785,511 entitled "Flight Recorder Deployment Mechanism" filed on Mar. 14, 2013, which is herein incorporated by reference in its entirety for all purposes.

BACKGROUND

In a catastrophic aviation event involving a downed aircraft, a flight recorder is one of the most useful tools for investigators to piece together the crucial moments leading up to the aircraft accident or incident to determine the cause of the crash. One type of flight recorder is a cockpit voice recorder (CVR) that records the audio environment of the flight deck of an aircraft. A CVR records conversations in the cockpit and communications between the cockpit crew and others such as air traffic control personnel on the ground. Another type of flight recorder is a flight data recorder that records information about the electronic and mechanical equipment of the aircraft. A flight data recorder records information such as flight parameters (e.g., altitude, speed, etc.) of the aircraft, and may include engine performance data, or other information useful in assisting investigators to determine the cause of a crash.

A flight recorder is designed to withstand high impact forces and high temperatures such that the flight recorder is likely to survive the conditions of a crash. However, while a flight recorder is designed to survive a crash, there is still a probability that the flight recorder may not survive if the crash conditions are extreme enough. Furthermore, a flight recorder is only useful if the flight recorder can be located after a crash. For example, when an aircraft crashes at sea and is submerged in water, locating the flight recorder affixed to the downed aircraft can take weeks to months, and even years, and can be costly in terms of the amount of money and time spent in locating the flight recorder. Even when an aircraft crashes on land, it may take significant effort and time to locate the flight recorder, for example, when the crash site is an unfamiliar or rough terrain. Such delay in locating the flight recorder not only frustrates investigators but can also risk the safety of other aircrafts. For example, when a catastrophic aviation event is caused by a design flaw in an aircraft component, the delay in identifying the problematic component can risk the safety of other aircrafts that employ the same type of aircraft component.

Flight recorders on aircraft collect at least 25 hours of flight data and two hours of cockpit voice information. This information is stored within a crash-survivable memory module which can be retrieved in the event of a crash or as part of regular maintenance. The Achilles'heel of typical "fixed" recorders is that they must be located in order to retrieve the data and in many cases cannot be found after a catastrophic incident. Deployable flight recorders solve this problem by separating from the aircraft during a crash thereby avoiding the extreme conditions of the impact zone and allowing for easier recovery.

Conventional deployable flight recorders rely on pyrotechnic or chemical systems to eject the flight recorder from the aircraft. Such systems require use of explosive devices to trigger the deployment in the event of a crash. For example, a low power explosive may be used to push the flight recorder off the aircraft. However, use of such systems can be a safety risk for installers and maintenance workers. Additionally, the presence of explosive devices on the aircraft may cause a safety concern among the passengers. In some cases, transportation regulations may not allow the use of explosive devices on an aircraft.

Embodiments of the invention address these and other problems, individually and collectively.

BRIEF SUMMARY

Embodiments of the invention are directed to devices and methods for deploying a deployable unit without the use of an explosive. Embodiments of the invention include a release device that utilizes an electro-mechanical mechanism to deploy a deployable flight recorder from an aircraft in the event of a crash. As compared to conventional deployment systems that rely on explosive systems involving pyrotechnics or chemicals, embodiments of the invention provide increased safety margin for installers and maintenance workers, as well as an increase in the operational safety of an aircraft due to the elimination of explosive devices from the aircraft.

In one embodiment of the invention, when a flight data recorder is mounted to a mounting tray on the aircraft, a spring is kept in a compressed state using a ball bearing interlocking mechanism. In the event of a crash, an actuator may activate a piston to provide a pulling or pushing motion of a pin that is engaged with the ball bearings. This results in the ball bearings to collapse into a channel, thus releasing the spring. The spring extends from a compressed state and pushes the flight data recorder, thereby deploying it. The deployment or release mechanism may be based on a solenoid, a release actuator mechanism, a pneumatic actuator mechanism, a shape memory alloy or a combination thereof that can be used to push or pull the pin.

One embodiment of the invention is directed to a release device for a deployable unit. The release device comprises a biasing element for interfacing with the deployable unit and an electrical device operationally coupled to the biasing element. The release device is free of an explosive.

One embodiment of the invention is directed to a method for deploying a deployable unit. The method includes receiving an electrical activation signal, by an electrical device, in response to an unexpected event. In response to receiving the electrical activation signal, by the electrical device, a biasing element interfacing with the deployable unit is activated to allow the biasing element to expand to an extended configuration from a retracted configuration and deploy the deployable unit without the use of explosives.

These and other embodiments of the invention are described in further detail below.

DETAILED DESCRIPTION

Embodiments of the invention are directed to a release device that employs an electro-mechanical release mechanism without requiring the use of pyrotechnics and/or explosives. In a catastrophic event or a crash, a deployable flight recorder is designed to disengage from the aircraft and move away from the aircraft body to improve recovery of the flight recorder after a crash. In some embodiments, the deployable flight recorder may be placed in the vertical tail fin of an aircraft or at other locations on the aircraft (e.g., on the airframe, one of the wings, etc.). A crash may be detected by using one or more crash detection or deployment sensors. For example, an acceleration based switch may detect if the aircraft comes to a sudden stop or is in free fall, a frangible switch may detect deformation of the aircraft body, or an immersion sensor may detect if the aircraft is immersed or submerged in water.

In some embodiments of the invention, a release device may include a biasing element and an electrical device operationally coupled to the biasing element. The biasing element may include any suitable device which can assume an extended configuration and a retracted configuration. For example, in some embodiments, the biasing element may include a spring or any other suitable compressible material that can exist in a compressed or extended configuration. In other embodiments, the biasing element may also include a pneumatic cylinder or other non-explosive mechanical device that can assume an extended or retracted configuration.

The electrical device may include any suitable device that may receive and provide an electrical signal. For example, in some embodiments, the electrical device may include a solenoid, a switch, a relay, etc.

The release device may also include a piston within the solenoid and a pin coupled to the piston. The pin can be at least partially surrounded by the biasing element. The release device may also include an interlocking mechanism that may be used to hold the biasing element in a compressed state when a deployable flight recorder is mounted in a mounting tray on an aircraft. When the crash detection sensors indicate a deployment criteria is satisfied (e.g., a crash or a potential crash is detected), an electrical activation signal may cause the interlocking mechanism to disengage, allowing the biasing element to expand and to push the deployable flight recorder into the air stream.

The electro-mechanical release mechanism according to embodiments of the invention may be implemented using a solenoid, a release actuator mechanism, shape memory alloy or a pneumatic actuator mechanism using compressed air or non-explosive inert gas. As compared to conventional release mechanisms involving pyrotechnics or chemicals that rely on thermal excitation with an inherent risk of causing fire, embodiments of the invention provide a safer, low maintenance and more reliable solution over conventional release mechanisms.

Figure 1:
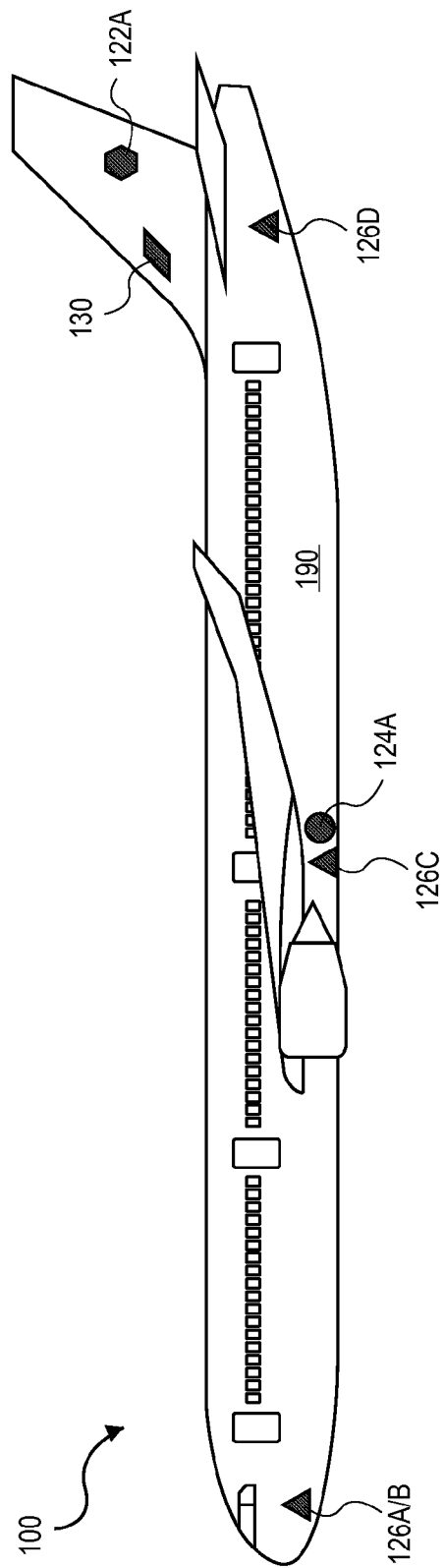
FIG. 1 illustrates an automatic deployable flight recorder (ADFR) system on an aircraft according to some embodiments.

FIG. 1 illustrates an automatic deployable flight recorder (ADFR) system 100 on an aircraft 190. The ADFR system 100 may include a deployable flight recorder 130 on the vertical tail fin of aircraft 190 and crash sensors 122A, 124A, and 126A-D installed at various locations on the aircraft 190. The deployable flight recorder 130 may be designed to deploy and separate from aircraft 190 when the crash sensors 122A, 124A, and 126A-D working in a cooperative manner indicate that a deployment criteria (i.e. a deployment condition to initiate deployment of deployable flight recorder 130) is satisfied. The deployment criteria of the ADFR system 100 may change depending on the flight condition of the aircraft 190 such as when the aircraft is on the ground when the aircraft is taking off or landing, or when the aircraft is in flight at a cruising altitude or at a cruising speed.

In some embodiments, the deployable flight recorder 130 may be advantageously installed near the leading edge of the root of the vertical tail fin of the aircraft 190 as shown in FIG. 1. Such a location may allow the deployable flight recorder 130 to safely separate from an aircraft without impacting the body of the aircraft when deployed during a crash under a variety of different flight conditions such as when the aircraft is climbing (e.g., during takeoff), descending (e.g., during landing), or in flight at a cruising altitude. Although the location of the deployable flight recorder 130 as shown in FIG. 1 is optimized to allow safe deployment from the aircraft 190, the deployable flight recorder 130 can alternatively be installed at other locations of the aircraft 190. For example, in other embodiments, the deployable fight recorder can be installed on other sections of the vertical tail fin, on the horizontal tail fin, on the airframe, or on either of the wings, etc.

The ADFR system 100 may include crash sensors that may be used to measure or monitor various physical parameters (e.g., water immersion, inertia including acceleration and/or deceleration, structural deformation, etc.) to detect conditions of a crash or conditions with a high likelihood of leading up to a crash, and may include various different types of crash sensors corresponding to the different types of physical parameters being measured or monitored. For example, the ADFR system 100 may include one or more immersion sensor(s) 122A, one or more inertia sensor(s) 124A, and/or one or more structural sensor(s) 126A-D. The ADFR system 100 may also include other types of sensors such as impact pressure sensors, acoustic crash sensors, and/or radar or optical crash sensors.

Immersion sensor(s) 122A may be used to detect submersion of an aircraft in a body of water. Immersions sensor(s) 122A may include submersion sensors and/or hydrostatic switches or immersion switches to detect sinking of an aircraft. Immersion sensors can be placed at strategic locations on the aircraft to reliably detect the sinking of an aircraft and/or to differentiate between a safe water landing and a catastrophic crash into a body of water. For example, immersion sensor 122A can be installed on the vertical tail fin of aircraft 190 as shown in FIG. 1, and in some embodiments, can be attached to a mounting tray that holds the deployable flight recorder 130 on the vertical tail fin.

Inertia sensor(s) 124A may be used to measure sudden changes in the velocity (acceleration and/or deceleration) of an aircraft to detect movement of the aircraft indicating a crash event.

Structural sensor(s) 126A-D may be used to detect deformation of the structure of the aircraft such as deformation of the exterior shell of the aircraft or structural separation of sections of the aircraft. Structural sensors 126A-D can include frangible switches to detect a crash condition. Structural sensors 126A-D can be placed at strategic locations on the aircraft at sections of the aircraft that are most likely to deform by impact forces.

In addition to the various types of crash sensors described above, the ADFR system 100 in some embodiments may also include embedded aircraft sensors that may be used for maintenance and flight quality assurance.

Figure 2:
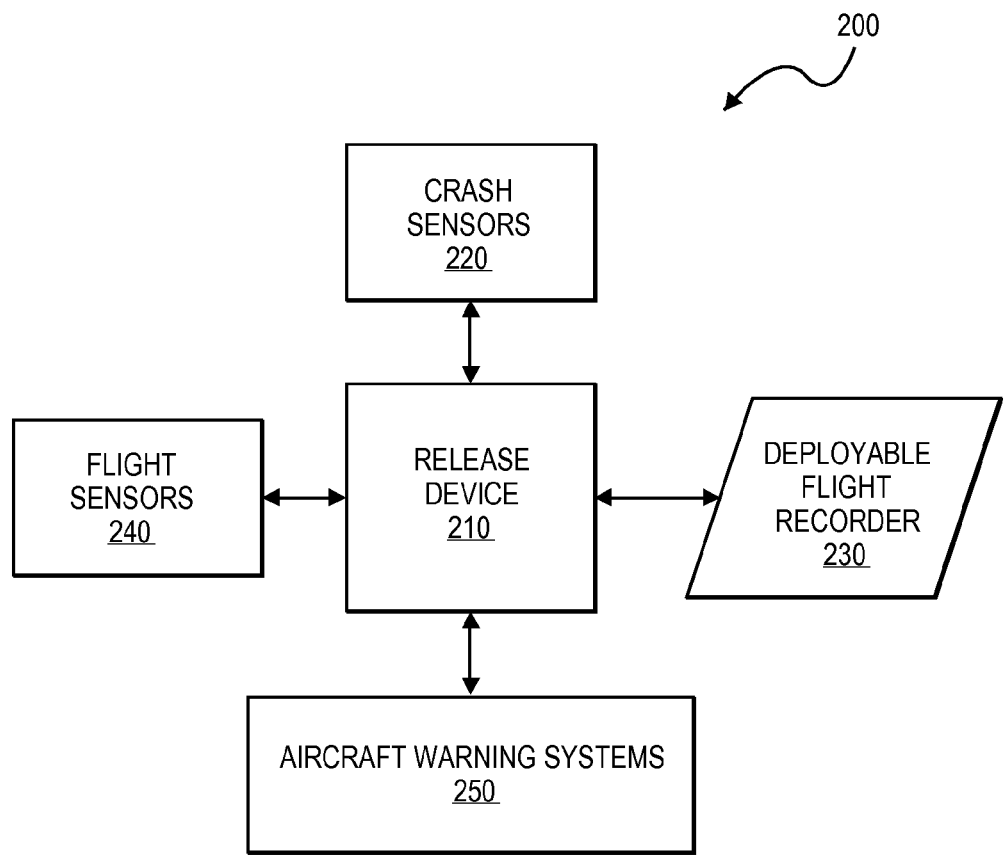
FIG. 2 illustrates a block diagram of an ADFR system according to some embodiments.

FIG. 2 illustrates a block diagram of an ADFR system 200 in some embodiments of the invention. The ADFR system 200 may include a release device 210 communicatively coupled to crash sensors 220, flight sensors 240, and aircraft warning systems 250. The release device 210 may also be communicatively coupled to a deployable flight recorder 230, and may be configured to activate deployment of the deployable flight data recorder 230 from an aircraft when a deployment condition is detected (i.e. a deployment criteria is satisfied). In some embodiments, the deployment criteria may depend on the flight condition of the aircraft as indicated by flight status information from flight sensors 240 and/or danger warnings from aircraft warning systems 250.

The crash sensors 220 of the ADFR system 200 may include one or more immersion sensor(s) 122A, one or more inertia sensor(s) 124A, and/or one or more structural sensor(s) 126A-D, as described with reference to FIG. 1. The crash sensors 220 may include one or more of other types of crash sensors such as an impact pressure sensor, an acoustic crash sensor, and/or a radar or optical crash sensor that are suitable for detecting a crash condition. Crash sensors 220 may also include embedded aircraft sensors as described above.

Flight sensors 240 may include sensors on the aircraft for measuring flight status information or flight parameters such as weight-on-wheels, speed (e.g., air speed and/or ground speed), acceleration, altitude, pitch, roll, engine speed, parking brake status, landing gear status, etc. In some embodiments, the flight status information from the flight sensors 240 can be used by the release device 210 to adjust the deployment.

The aircraft warning systems 250 may be automatic safety systems of an aircraft that may alert the pilot of impending danger. The aircraft warning systems 250 may include Master Caution/Warning Systems, Ground Proximity Warning Systems, Collision Avoidance Systems, Stall Warning Systems, Power Loss Warning Systems, etc.

In some embodiments of the invention, the release device 210 may receive an electrical activation signal from one or more of the crash sensors 220, flight sensors 240 and the aircraft warning systems 250 when a deployment criteria is satisfied. The release device 210 may enable the deployment of the deployable flight recorder 230 based on the electrical activation signal. For example, an electrical device in the release device 210 may enable a biasing element interfacing with the deployable flight recorder 230 to expand based on an electro-mechanical mechanism, thus releasing the deployable flight recorder 230.

Figure 3A:
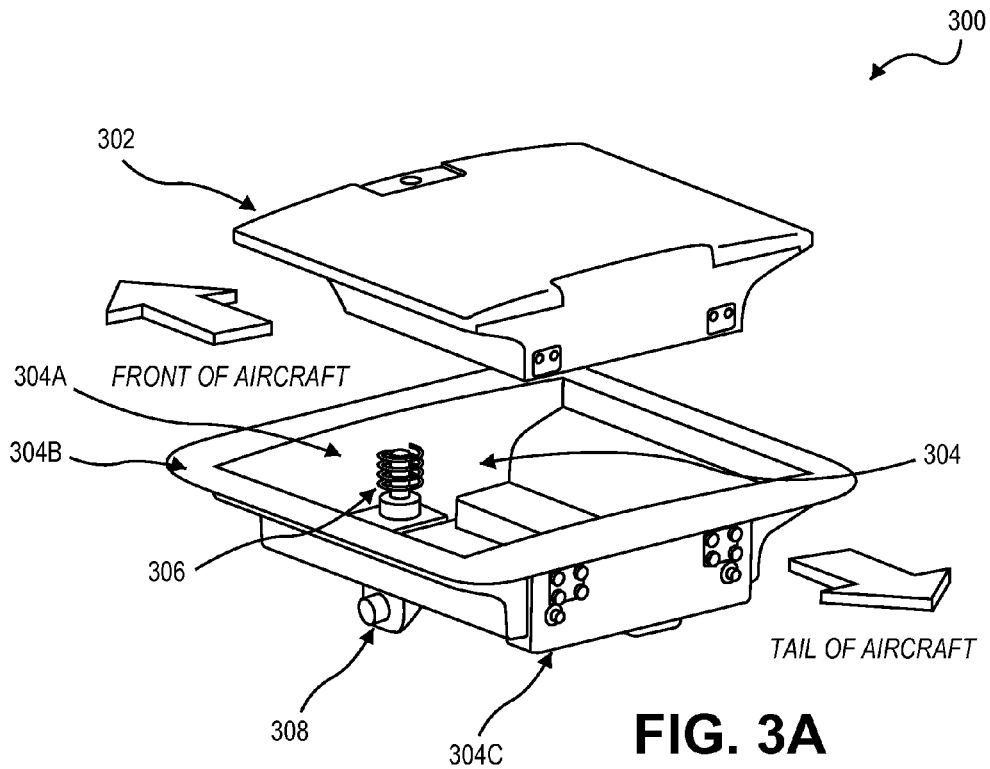
FIG. 3A shows a deployable flight recorder assembly, according to some embodiments of the invention.

FIG. 3A shows a deployable flight recorder assembly 300 for a deployable flight recorder 302. The deployable flight recorder 302 may be similar to the deployable flight recorder 230 as shown in FIG. 2. The deployable flight recorder assembly 300 may include a mounting tray 304 that may be affixed to the aircraft (e.g., aircraft 190) and may hold the deployable flight recorder 302 securely to the aircraft when the deployable flight recorder 302 is in the undeployed state. When the deployable flight recorder 302 is mounted to the mounting tray 304, the top surface of the deployable flight recorder 302 may be flushed with the aircraft skin to reduce aerodynamic drag. The mounting tray 304 may comprise a rim 304B, which defines a cavity 304A. The cavity 304A may be cooperatively structured with respect to the shape of the deployable flight recorder 302. A release device 306 may also be present within the cavity 304A of the mounting tray 304. One end of the release device 306 may be attached to the mounting tray 304 or may be attached to the underlying aircraft structure through the base 304C of the mounting tray 304. The release device 306 may be similar to the release device 210 as shown in FIG. 2 and may be communicatively coupled to the crash sensors 220, flight sensors 240 and/or the aircraft warning systems 250.

The release device 306 may be configured to deploy the deployable flight recorder 302, for example, when one or more crash sensors (e.g., crash sensors 220) detect a deployment criteria indicative of a crash or a potential crash, or when a pilot provides user input (e.g., pushes a release button) to manually deploy the deployable flight recorder 302 in case of an emergency (e.g., aircraft warning systems 250). When deployed, the deployable flight recorder 302 is designed to move away from the aircraft, and to separate from the aircraft without coming in contact with the aircraft structure after deployment. The base 304C of the mounting tray 204 may provide a cable connector 308 that can be connected to a cable (not shown) to receive signals from aircraft electronics and equipment. These signals may include an electrical activation signal that may be used to control the deployment of the deployable flight recorder 302, as well as other signals that are used for transmitting cockpit voice data and/or flight data to the deployable flight recorder 302 for recording. For example, the electrical activation signal may be provided by the crash sensors 220, flight sensors 240 and/or the aircraft warning systems 250.

Figure 3B:
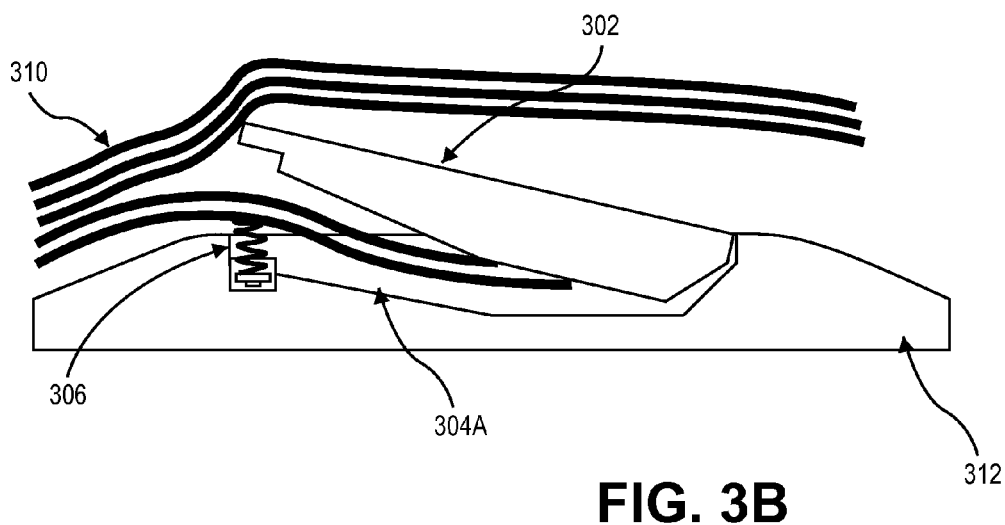
FIG. 3B shows a deployable flight recorder as it moves away from the aircraft structure, according to some embodiments of the invention.

FIG. 3B shows deployable flight recorder 302 as it starts to move away from an aircraft structure 312 (e.g., aircraft 190) during deployment, according to some embodiments. The deployable flight recorder 302, which was previously held in the cavity 304A of the mounting tray 304, is shown as separating from the mounting tray 304 and the aircraft structure 312. When the deployable flight recorder 302 is deployed, a spring of the release device 306 may release or decompress in an outward direction away from the aircraft structure 312 to cause a front portion of the deployable flight recorder 302 to raise up from the aircraft structure 312. The airstream 310 may push the front portion of the deployable flight recorder 302 outward as a rear portion of the deployable flight recorder 302 rotates in contact with a rear wall of the cavity 304A. This motion may allow the airstream to provide lift to the deployable flight recorder 302 to enable the deployable flight recorder 302 to safely separate from the aircraft structure 312.

Figure 4:
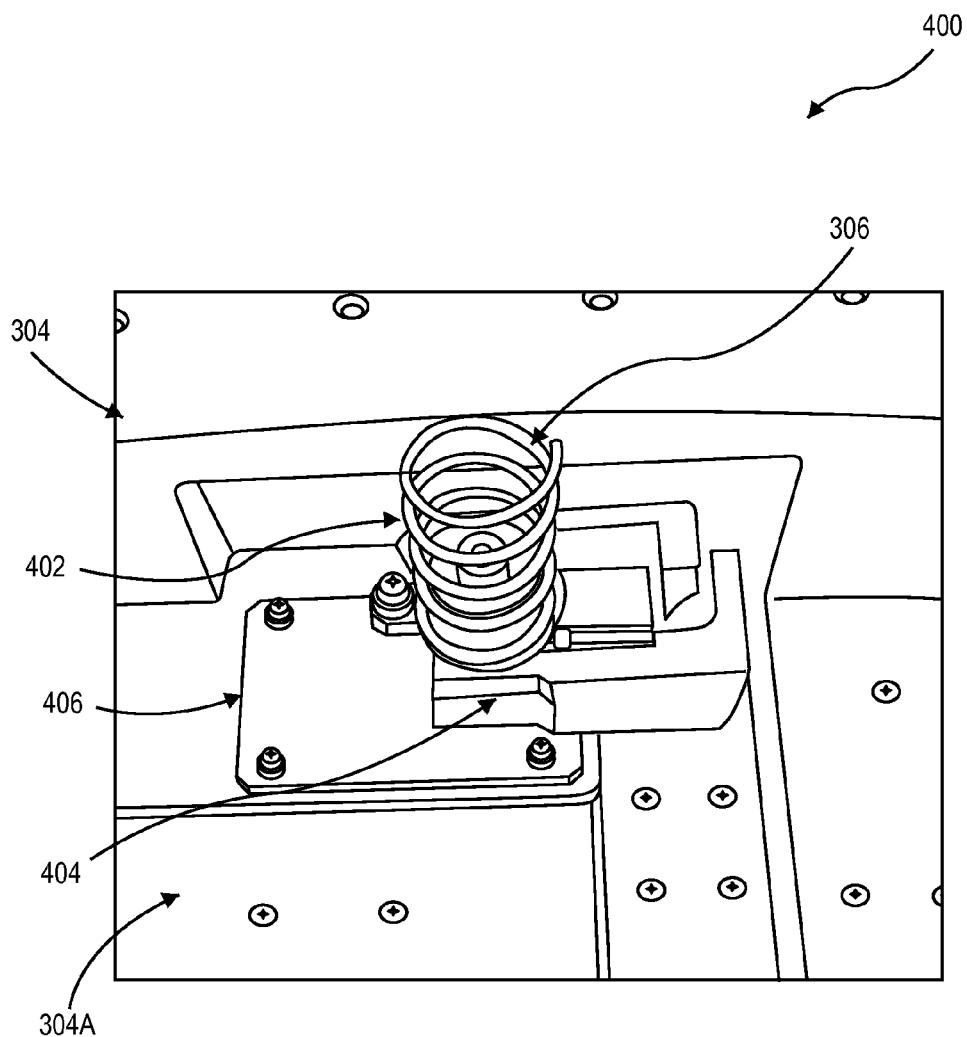
FIG. 4 shows close up view of a release device, according to some embodiments of the invention.

FIG. 4 shows the release device 306 housed inside the mounting tray 304. In one embodiment, the release device 306 may comprise a spring 402 (in an extended configuration) coupled or attached to a base member 404 that is secured to a mounting plate 406. The mounting plate 406 may be affixed to the inner surface of the cavity 304A. In other embodiments, the release device 306 can be affixed directly to the body of the aircraft 190 through a hole or void in the mounting tray 304. It will be understood that other mechanisms to couple the release device 306 to the aircraft 190 are possible.

Figure 5A:
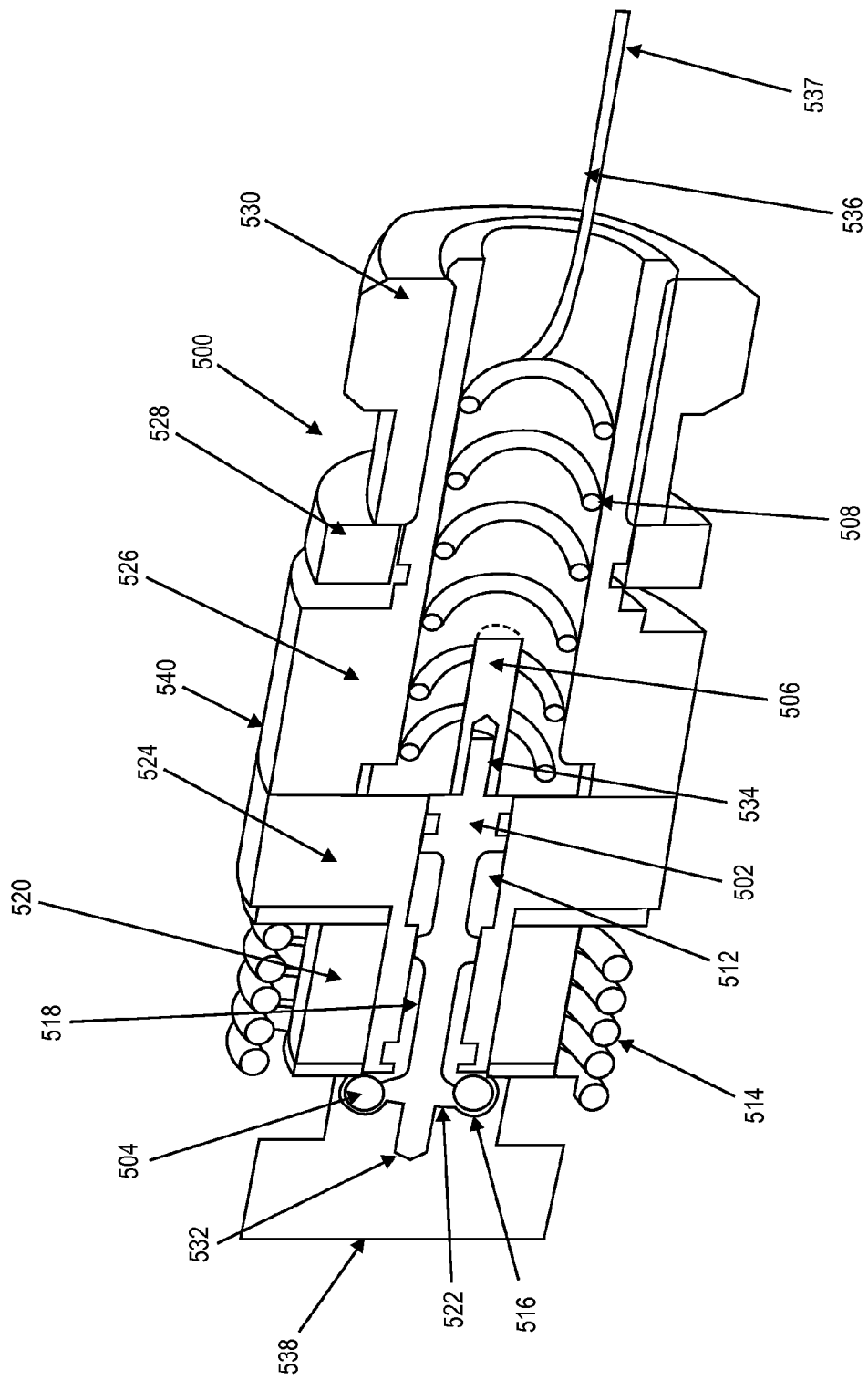
FIG. 5A shows a cross sectional view of a release device, according to some embodiments of the invention.

FIG. 5A shows a cross section view of a release device 500 that can be used to deploy a deployable unit, according to some embodiments of the invention. For example, the release device 500 may be used to deploy the deployable flight recorder 302 as shown in FIG. 3A and 3B. In one embodiment, the release device 500 may be installed inside the cavity 304A of the mounting tray 304. The release device 500 may include a biasing element 514, a pin 502 at least partially within the biasing element 514, a piston 506 coupled to the pin 502, a solenoid 508 around the piston 506, and one or more ball bearings 504 engaged with the pin 502. The release device 500 may also include a body 540 that may include one or more separable components. In this example, the body 540 includes a rubber bushing 520 at a front region of the release device 500, a pin housing 524 in contact with the rubber busing 520, an actuator housing 526 coupled to the pin housing 524, a bushing 528 at a rear region of the release device 500 and proximate to the actuator housing 526, and a connector assembly 530 at the rear region of the release device 500 and being electrically and mechanically coupled to the solenoid 508.

Different parts of the body 540 may include same or different material such as rubber, plastic, metal, etc.

The release device 500 may be configured to interface with a deployable unit 538 by engaging with one or more catches 516 on the deployable unit 538.

The biasing element 514 may include a spring or a compressible material. The biasing element 514 may be external to the body 540 of the release device 500 and may be exposed. One end of the biasing element 514 may be attached to the body 540 of the release device 500. In other embodiments, the biasing element 514 may be freestanding and is pushed against the body 540 of the release device 500 by the deployable unit 538 that may be installed in the cavity 304A of the mounting tray 304. The biasing element 514 may be configured to at least partially surround the pin 502 that may be housed in the pin housing 524, when the biasing element 514 is compressed or extended.

The pin housing 524 may house the pin 502 and define a channel 512 in which the pin 502 can move. For example, the channel 512 may be part of a hollow passage along an axis of the pin housing 524. In some embodiments, the hollow passage may include appropriate dimensions to accommodate various ridges and grooves on the pin 502. According to some embodiments, the pin 502 may be allowed to move along the length of the channel 512 (e.g., horizontally as shown in the perspective of FIG. 5). In other embodiments, the channel 512 may be defined to allow the pin 502 to move in other directions.

The pin 502 may include a set of one or more ridges (or bearing shoulders/surfaces) 522 and a set of one or more grooves 518. A first end 532 of the pin 502 may be flat or may be elongated. In some embodiments, each ridge in the set of ridges 522 near the first end 532 of the pin 502 may be designed to push against a ball bearing 504 to keep the biasing element 514 in the compressed state.

A second end 534 of the pin 502 may be coupled to the piston 506. For example, the second end 534 of the pin 502 may be attached to the piston 506 or may be screwed into a front end the piston 506. The pin 502 may include appropriate dimensions to allow the pin 502 to be able to move freely within the channel 512. The pin 502 may comprise a rigid material such as stainless steel 17-4PH. Note that the design of the pin 502, as shown in FIG. 5A, corresponds to one embodiment, but other suitable designs of the pin 502 are possible. In some embodiments, the first end 532 of the pin 502 may be used to set off a switch in the flight data recorder (not shown in FIG. 5A) when the biasing element 514 is released. The switch may be a switch that activates a device in the flight data recorder such as a signal such as light, homing beacon, etc.

The piston 506 may be configured to move freely within the solenoid 508. In some embodiments, the piston 506 may also be referred to as a core and may comprise a magnetic material such as iron. The piston 506 may include a cylindrical, rectangular or any suitable shape that may allow the piston 506 to move along an axis within the solenoid 508. In some embodiments, the force generated by the solenoid 508 may depend upon the material and shape of the piston 506.

The solenoid 508 may include electromagnetically inductive coil. The solenoid may be configured to convert electrical energy into linear motion when activated by an electrical activation signal. For example, when an electrical activation signal 537 in a wire 536 is received by the release device 500, the solenoid 508 may generate a magnetic field that may cause the piston 506 (or core) within the solenoid 508 to move. In some embodiments, dimensions of the solenoid 508 may determine the appropriate force required to deploy the deployable unit 538. Dimensions of the solenoid may include length of the coil, number of turns in the coil, thickness of the coil, etc. For example, the dimensions of the solenoid 508 may determine the magnetic field generated by the solenoid 508 to move the piston 506 which moves the pin 502 resulting in release of the biasing element 514. In some embodiments, the force generated by the solenoid 508 may also depend upon the material of the coil and the winding of the coil. In some embodiments, the force generated by the solenoid 508 in order to deploy a deployable flight recorder may be in the range of 40-60 pounds.

Figure 5C:
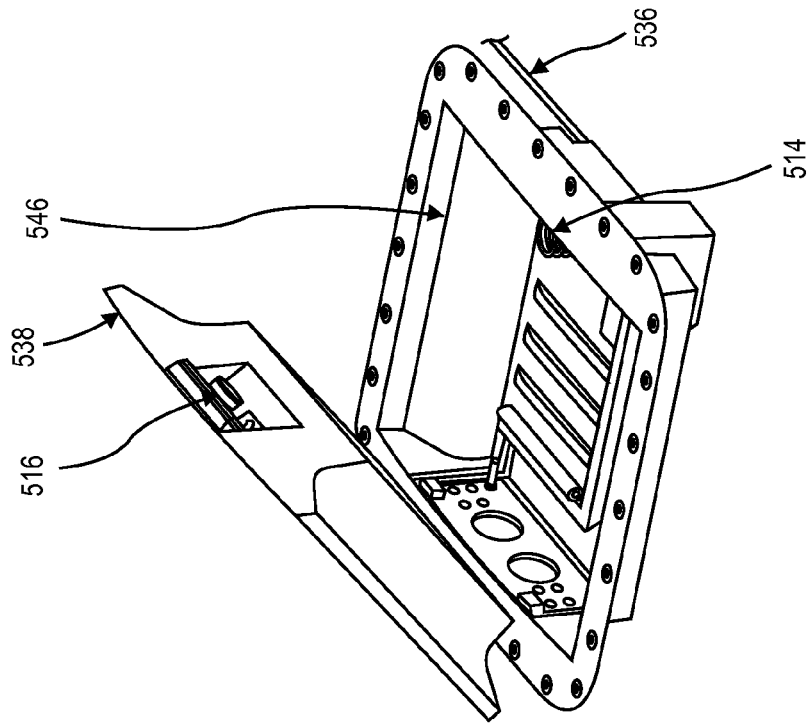
FIG. 5C shows a perspective view of an assembly including a release device and a deployable flight recorder, according to some embodiments of the invention.
Figure 5B:
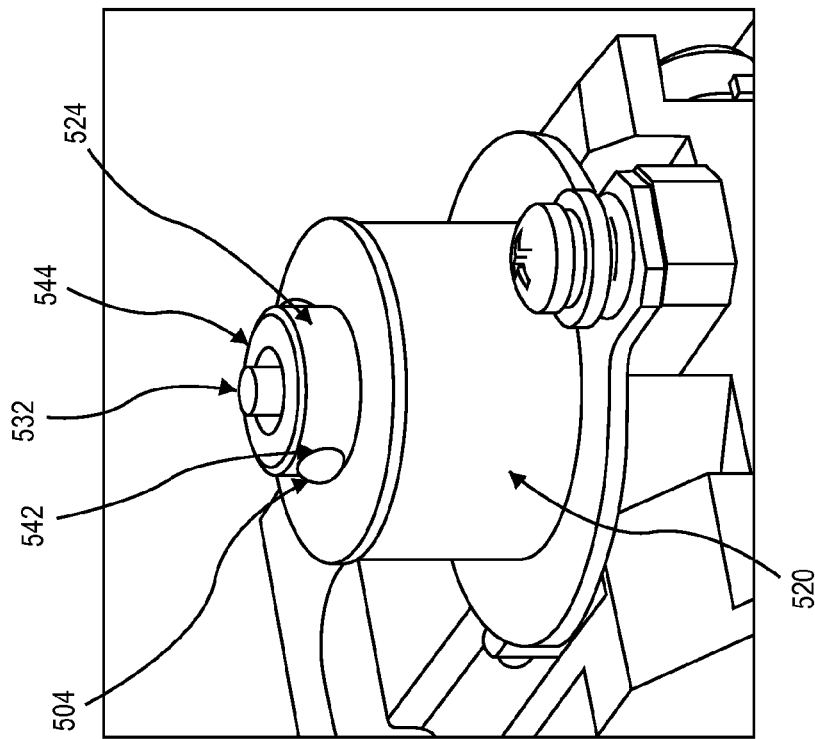
FIG. 5B shows a close up view of one end of the release device, according to some embodiments of the invention.

The pin housing 524 may also include a set of one or more openings or apertures 542 in a collar 544 of the release device 500, as shown in FIG. 5B. The ball bearings 504 engage with the catch 516 on the deployable unit 538 to hold the biasing element 514 in a compressed state. When the release device 500 is in the unreleased or undeployed state, the pin 502 is held in a position in which one or more of ridges 522 on the pin 502 push against the ball bearings 504 radially outward from the channel 512 such that ball bearings 504 partially protrude out of the collar 544 through the openings 542. The openings 542 can be shaped to prevent the ball bearings 504 from being pushed out through the openings 542. For example, each of the openings 542 may be a circular opening with a radius that is smaller than the radius of the ball bearing 504. In this manner, ball bearings 504 cannot fall out of the openings 542, and the ball bearings 504 can be retained with the release device 500.

FIG. 5C illustrates an exemplary embodiment of the deployable unit 538 with the catch 516. The catch 516 can be a latch, a socket, a clip, a clasp, or other mechanical structure that snugly mates with the exposed portions of the ball bearings 504. For example, the catch 516 may have a set of one or more depressions, grooves, or cavities having a semi-spherical shape that is cooperatively structured with the shape of the exposed portions of ball bearings 504 such that the catch 516 can grip onto and interlock with the ball bearings 504. In some embodiments, the catch 516 may be provided as part of the housing of the deployable unit 538 such that when the deployable unit 538 is installed in a mounting tray 546, the deployable unit 538 pushes against the biasing element 514, and the catch 516 on the housing of the deployable unit 538 interlocks with the ball bearings 504 to keep the biasing element 514 compressed. In other embodiments, the catch 516 can be provided as part of the mounting tray 546 or part of the release device 500 such that the biasing element 514 can be kept in a compressed state independently of whether a deployable unit 538 is installed in the mounting tray 546.

Referring back to FIG. 5A, movement of the pin 502 in the channel 512 may be controlled by the solenoid 508. When the solenoid 508 is activated, the piston 506 coupled to pin 502 can push or pull the pin 502 along the length of the channel 512. The solenoid 508 may be activated by an electrical activation signal 537 when a crash event is detected to deploy the deployable unit 538. The electrical activation signal 537 may provide an electrical current to the solenoid 508 to move the piston 506 forward towards the biasing element 514 or backwards towards the right side from the perspective of FIG. 5A. In some embodiments, the electrical activation signal 537 may be provided through the cable connector 308 as shown with reference to FIG. 3A.

The pushing or pulling motion of the piston 506 may cause the pin 502 to move axially within the channel 512. Movement of the pin 502 may cause the ridges 522 on the pin 502 to slide against the ball bearings 504 until the ridges 522 disengage with the ball bearings 504. When movement of the pin 504 aligns the grooves 518 with the openings 542 as the pin 502 is being pushed forward or pulled backward, the space provided by the grooves 518 in the channel 512 allows the ball bearings 504 to fall or collapse into the channel 512. When the ball bearings 504 collapse into the channel 512, the ball bearings 504 no longer protrude out of the openings 542. As a result, the catch 516 used to hold the biasing element 514 in the compressed state is no longer interlocked with the ball bearings 504. This releases the biasing element 514 into an uncompressed state, pushing the deployable unit 538 outward from the mounting tray 546, and hence deploying the deployable unit 538 from the aircraft.

In other embodiments, instead of using spherical ball bearings as the interlocking mechanism, other shapes can be used. For example, a trapezoidal spacer can be used. A trapezoid shaped spacer may allow the spacer to protrude out from the opening of the pin housing without falling out of the pin housing. The trapezoid shaped spacer can similarly collapse into the channel of the pin housing using the techniques described above to affect deployment of the deployable unit. In other embodiments, other latching mechanism that can be released by the movement of a pin can be used.

In some embodiments, the release device 500 may include a pneumatic actuator device coupled to the solenoid 508. For example, the solenoid 508 may be used as a valve, a relay or a switch which may be activated by the electrical activation signal 537. The pneumatic actuator may utilize a compressed air or a non-explosive inert gas pressure system to move the piston 506 when enabled by the solenoid 508. For example, a standard air hose nipple may be provisioned by the electrical activation signal 537 to change the pressure of the compressed air or the non-explosive inert gas to move the piston 506. In some embodiments, the pneumatic actuator and the solenoid 508 may be housed inside the actuator housing 526.

In some embodiments, the release device 500 may include a release actuator device coupled to the solenoid 508. For example, the release actuator device may utilize a linear, rotary or any other suitable release actuator to move the piston 506 when the current is supplied to the solenoid 508.

In some embodiments, a shape memory alloy may be used to engage the catch to hold the biasing element 514 in a compressed state. Shape memory alloys are metals that can change their shape in response to an electrical or magnetic charge. Some common examples of shape memory alloys include Nickel-Titanium, Copper-Aluminum-Nickel and Copper-Zinc-Aluminum. In the inert state, the shape memory alloy maintains one shape, and when a sufficient electric or magnetic charge is applied, the shape memory alloy changes to a different shape. For example, the shape memory alloy may be shaped like a hook in the inert state. The hook portion can protrude out of a housing to engage with the catch 516 when the release device 500 is in the unreleased or undeployed state. When the electrical activation signal 537 is applied to the shape memory alloy, the shape memory alloy can straighten out to disengage the catch 516, and thus releasing the biasing element 514 to deploy the deployable unit 538. In other embodiments, the biasing element 514 may comprise a shape memory alloy. The shape memory alloy may be in the form of a coil spring that expands upon the application of current.

Figure 6A:
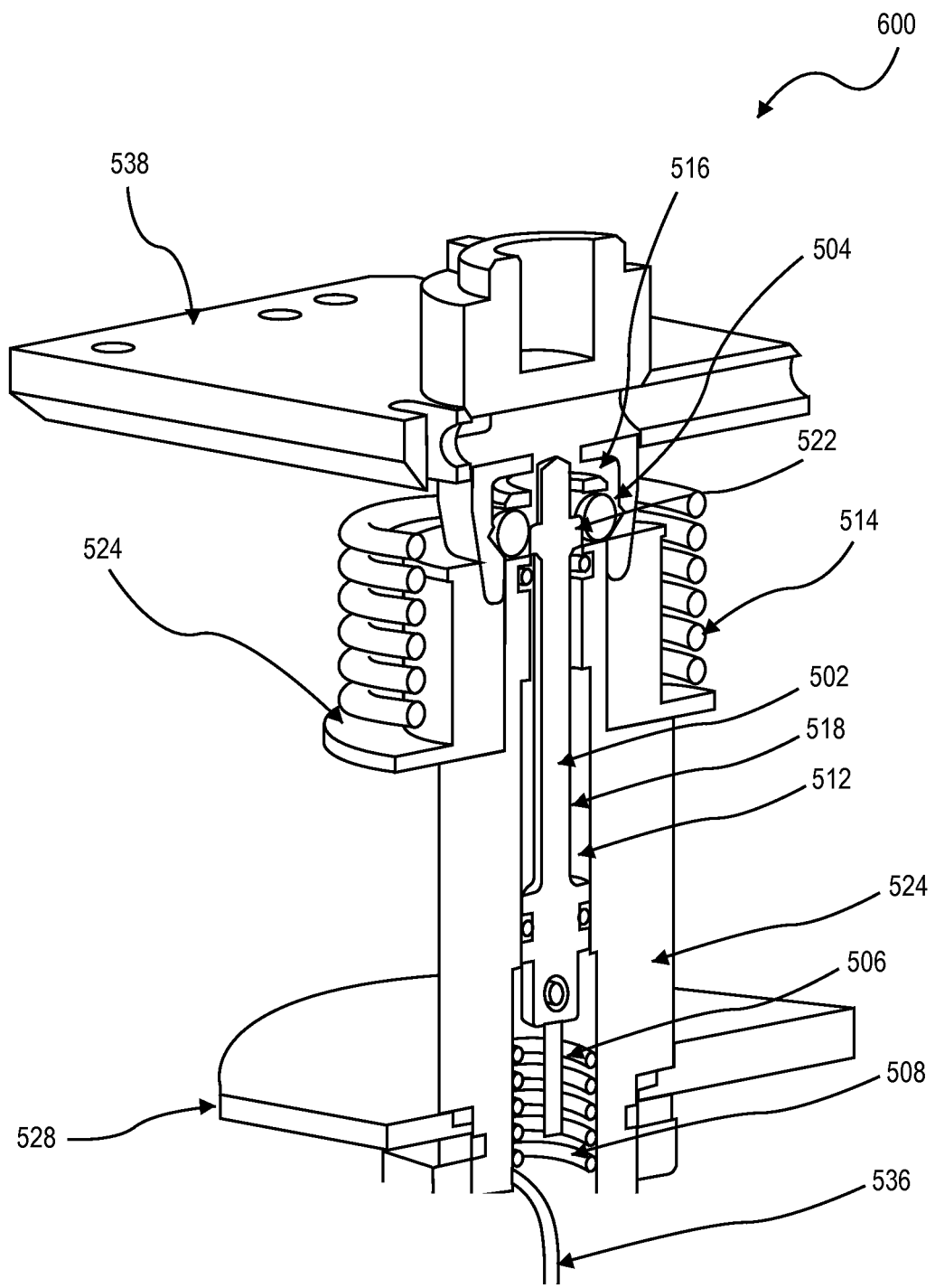
FIG. 6A shows a cross sectional view of a release device interfacing with a deployable flight recorder in an undeployed state, according to some embodiments of the invention.

FIG. 6A illustrates a cross section view of a release device engaged with a deployable unit.

An assembly 600 may include the release device 500 and the deployable unit 538. As illustrated in the figure, the deployable unit 538 is in an undeployed state. The ridges 522 of the pin 502 engage with and push against the ball bearings 504 to force the ball bearings 504 to partially protrude out of the openings 542, as shown in FIG. 5B. The catch 516 interlocks with the exposed portions of the ball bearings 504 to keep the biasing element 514 compressed. The catch 516 can be part of the housing of the deployable unit 538, or part of a mounting tray to which deployable unit 538 may be mounted or part of the release device 500.

Figure 6B:
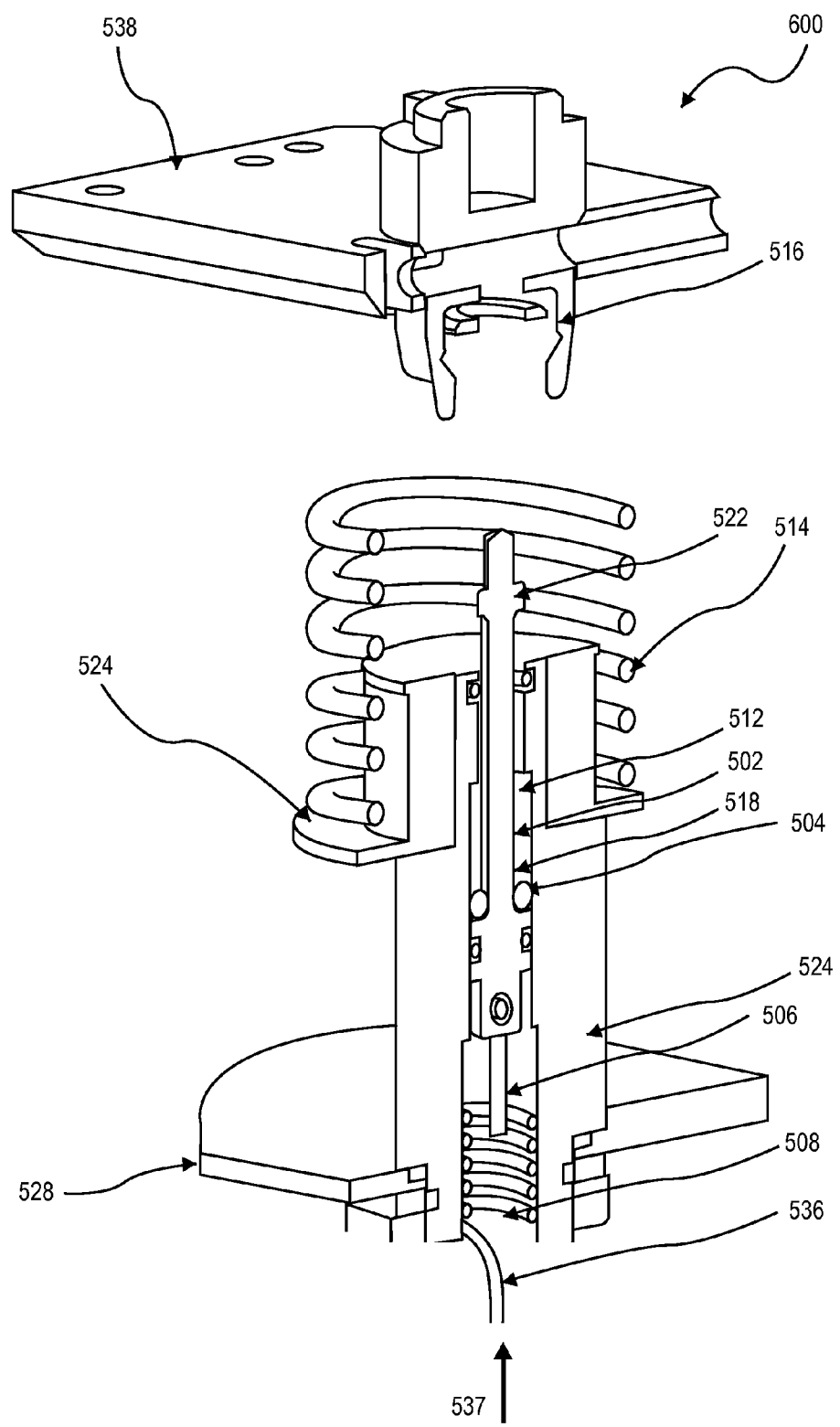
FIG. 6B shows a cross sectional view of a release device and a deployable flight recorder in a deployed state, according to some embodiments of the invention.

FIG. 6B shows the deployable unit 538 in the released or deployed state. An electrical activation signal indicating the detection of a crash or potential crash can activate the solenoid 508. The magnetic field generated by the solenoid 508 moves the piston 506 to cause the pin 502 to push forward towards the biasing element 514. Alternatively, the pin 502 can be pulled backwards away from the biasing element 514. This may allow the ball bearings 504 to roll around the ridges 522 and collapse into the channel 512. In some embodiments, the movement of the pin 502 may cause the openings in the pin housing 524 to align with the grooves 518. Once the ball bearings 504 fall into the channel 512, the catch 516 is no longer engaged with the ball bearings 504. As a result, the biasing element 514 is released into a decompressed state to push the deployable unit 538 off the mounting tray, and hence deploying the deployable unit 538 from the aircraft. In some embodiments, the actuation time to deploy the deployable unit may be in the order of 8 milliseconds after the electrical activation signal is received.

Figure 7:
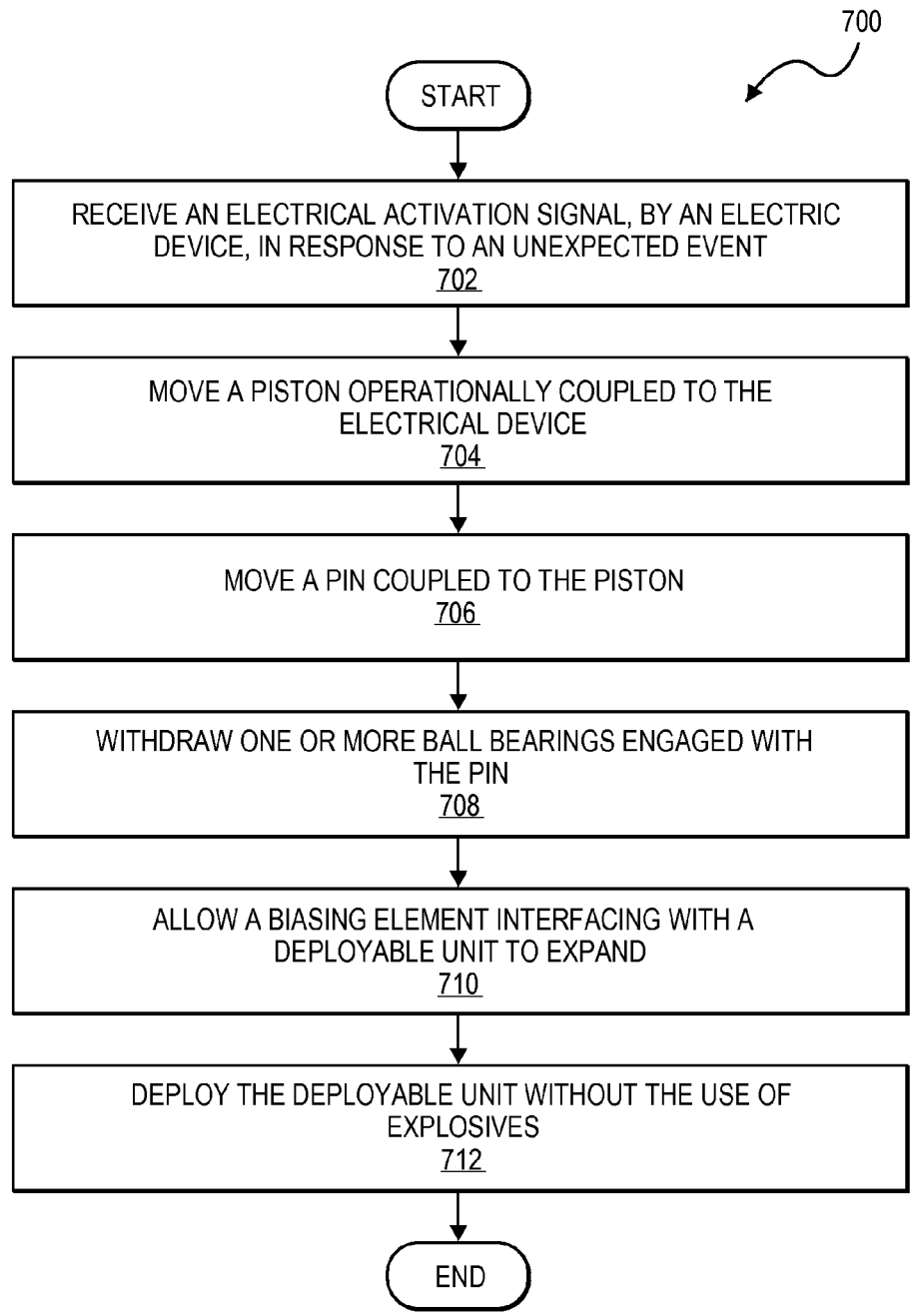
FIG. 7 shows a flow diagram for deploying a deployable unit, according to some embodiments of the invention.

FIG. 7 shows a flow diagram for a method to deploy a deployable unit interfacing with a release unit, in accordance with some embodiments of the invention.

In step 702, an electrical activation signal is received by an electric device in response to an unexpected event. For example, the electrical activation signal 537 may be received by the release device 500 from one of the sensors in the event of a crash, as described with reference to FIG. 2. The electrical activation signal 537 may be received in the wire 536 via the cable connector 308 as shown in FIG. 3A.

In step 704, a piston operationally coupled to the electrical device is moved. Referring back to FIG. 6B, the electrical activation signal 537 may be used to provide current to the solenoid 508 to activate the solenoid 508. Applying current to the solenoid 508 may generate a magnetic field which can move the piston 506 within the solenoid 508.

In step 706, a pin coupled to the piston is moved. Movement of the piston 506 may cause the pin 502 coupled to the piston 506 to move. For example, the pin 502 may move within the channel 512 in the pin housing 524.

In step 708, one or more ball bearings engaged with the pin are withdrawn from apertures in a housing and a catch in the deployable unit. For example, moving the pin 502 may cause the ball bearings 504 engaged with the pin 502 to withdraw from the openings 542 in the housing 524 and the catch 516 in the deployable unit 538.

In step 710, a biasing element interfacing with the deployable unit is allowed to expand to an extended configuration from a retracted configuration. As discussed previously with reference to FIG. 6A, prior to receiving the activation signal 537 in the wire 536, the deployable unit 538 may be engaged with the release unit 500 (e.g., by the catch 516) keeping the biasing element 514 compressed. Referring back to FIG. 6B, the biasing element 514 may be expanded when the ball bearings 504 are withdrawn due to the movement of the pin 502. In some embodiments, a shape memory alloy may be used to release the biasing element 514, as described previously.

In step 712, the deployable unit interfacing with the biasing element is deployed or released without the use of explosives. Referring back to FIG. 6B, release of the biasing element 514 may cause the catch 516 on the deployable unit 538 to disengage from the release unit 500 and deploy the deployable unit 538 to move away from the aircraft body.

In embodiments of the invention, deployment of a deployable unit can be accomplished using electro-mechanical means, instead of the conventional methods of using pyrotechnics or chemical reactions. For example, the conventional release devices may use gun powder or black powder to ignite using a squib and move the piston with a small explosion. Thus, embodiments of the invention can provide an increased safety margin for installers and maintenance workers. Additionally, it can provide an increase in the operational safety of an aircraft due to the elimination of explosive devices from the aircraft. Note that the embodiments of the invention are not limited to flight data recorders and may be used in fuel tanks, stores, doors, hatches, ramps, etc. where an electro-mechanical mechanism may be used.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A release device for a deployable unit, the release device comprising:
   a biasing element for interfacing with the deployable unit; and
   an electrical device operationally coupled to the biasing element,
   wherein the release device is free of an explosive, wherein the deployable unit is a deployable flight recorder, the biasing element is a spring and the electrical device comprises a solenoid, and wherein the release device further comprises:
   a piston within the solenoid; and
   a pin coupled to the piston,
   wherein the pin is at least partially surrounded by the spring,
   wherein the pin comprises a plurality of ridges, and wherein the release device further comprises a plurality of ball bearings in contact with at least one ridge in the plurality of ridges.

2. The release device of claim 1, wherein the release device further comprises a housing comprising a channel which receives the pin.

3. The release device of claim 1, wherein the deployable unit comprises one or more catches and wherein at least one catch engages with at least one of the plurality of ball bearings to keep the spring compressed.

4. The release device of claim 1, further comprising a wire coupled to the solenoid, wherein the wire is configured to receive an electrical activation signal.

5. The release device of claim 1, wherein the release device comprises a shape memory alloy.

6. The release device of claim 1, wherein the electrical device comprises an electrical switch.

7. The release device of claim 1, wherein the electrical device comprises a solenoid, a switch or a relay.

8. An assembly comprising:
   the release device of claim 1; and
   the deployable unit.

9. A system comprising the assembly of claim 8; and
   an aircraft coupled to the assembly.

10. A method for deploying a deployable unit, the method comprising:
    receiving an electrical activation signal, by an electrical device, in response to an unexpected event; and
    in response to receiving the electrical activation signal, by the electrical device, activating a biasing element interfacing with the deployable unit to allow the biasing element to expand to an extended configuration from a retracted configuration and deploy the deployable unit without the use of explosives, and
    wherein the method further comprises:
    moving a piston operationally coupled to the electrical device;
    moving a pin coupled to the piston; and
    withdrawing one or more ball bearings engaged with the pin from apertures in a housing and a catch in the deployable unit.

11. The method of claim 10, further comprising:
    prior to receiving the electrical activation signal, compressing the biasing element to keep the deployable unit in an undeployed state.

12. The method of claim 10, wherein the electrical device comprises a solenoid, the biasing element is a spring and the deployable unit is a deployable flight recorder.

13. The method of claim 10, wherein the biasing element comprises a shape memory alloy.

* * * * *